US012371527B2

(12) United States Patent
Bastioli et al.

(10) Patent No.: US 12,371,527 B2
(45) Date of Patent: *Jul. 29, 2025

(54) POLYESTER AND COMPOSITIONS CONTAINING IT

(71) Applicant: Novamont S.p.A., Novara (IT)

(72) Inventors: Catia Bastioli, Novara (IT); Luigi Capuzzi, Novara (IT); Tiziana Milizia, Novara (IT); Angelos Rallis, Novara (IT); Roberto Vallero, Borgo d'Ale (IT)

(73) Assignee: Novamont S.p.A., Novara (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,774

(22) Filed: Jul. 3, 2023

(65) Prior Publication Data

US 2023/0340188 A1 Oct. 26, 2023

Related U.S. Application Data

(62) Division of application No. 16/094,662, filed as application No. PCT/EP2017/059398 on Apr. 20, 2017, now Pat. No. 11,739,181.

(30) Foreign Application Priority Data

Apr. 20, 2016 (IT) .................. 102016000040946

(51) Int. Cl.
| | | |
|---|---|---|
| *C08G 63/181* | (2006.01) | |
| *B29C 45/00* | (2006.01) | |
| *B29K 67/00* | (2006.01) | |
| *C08G 63/16* | (2006.01) | |
| *C08G 63/199* | (2006.01) | |
| *C08G 63/52* | (2006.01) | |
| *C08J 5/04* | (2006.01) | |
| *C08J 5/18* | (2006.01) | |
| *C08K 3/013* | (2018.01) | |
| *C08K 5/00* | (2006.01) | |
| *C08K 7/02* | (2006.01) | |
| *C08L 67/02* | (2006.01) | |
| *C08L 97/02* | (2006.01) | |
| *C08L 99/00* | (2006.01) | |
| *C08L 101/00* | (2006.01) | |

(52) U.S. Cl.
CPC ........ *C08G 63/181* (2013.01); *B29C 45/0001* (2013.01); *C08G 63/16* (2013.01); *C08G 63/199* (2013.01); *C08G 63/52* (2013.01); *C08J 5/045* (2013.01); *C08J 5/18* (2013.01); *C08K 3/013* (2018.01); *C08K 7/02* (2013.01); *C08L 67/02* (2013.01); *C08L 97/02* (2013.01); *C08L 99/00* (2013.01); *C08L 101/00* (2013.01); *B29K 2067/00* (2013.01); *C08G 2230/00* (2013.01); *C08J 2367/02* (2013.01); *C08K 5/0025* (2013.01); *C08L 2201/06* (2013.01); *C08L 2205/16* (2013.01)

(58) Field of Classification Search
CPC .................................................. C08G 63/181
See application file for complete search history.

(56) References Cited

U.S. PATENT DOCUMENTS

| | | | |
|---|---|---|---|
| 2010/0174044 A1 | 7/2010 | Eritate | |
| 2010/0183843 A1* | 7/2010 | Kim | B32B 27/08 |
| | | | 428/480 |
| 2011/0071238 A1 | 3/2011 | Bastioli et al. | |
| 2011/0282020 A1 | 11/2011 | Sipos | |
| 2012/0201986 A1 | 8/2012 | Akiba | |
| 2012/0220680 A1 | 8/2012 | Bastioli et al. | |
| 2012/0316257 A1 | 12/2012 | Bastioli | |
| 2013/0071588 A1 | 3/2013 | Bastioli et al. | |
| 2013/0095263 A1 | 4/2013 | Carman, Jr. et al. | |
| 2013/0095272 A1 | 4/2013 | Carman, Jr. et al. | |
| 2013/0171397 A1 | 7/2013 | Ghosh et al. | |
| 2013/0217836 A1 | 8/2013 | Bastioli et al. | |
| 2013/0281560 A1 | 10/2013 | Bastioli et al. | |
| 2015/0031802 A1 | 1/2015 | Marini et al. | |
| 2015/0141584 A1 | 5/2015 | Saywell et al. | |
| 2015/0029173 A1 | 10/2015 | Hess et al. | |
| 2015/0343746 A1 | 12/2015 | Bhattacharjee et al. | |
| 2016/0333169 A1 | 11/2016 | Bastioli et al. | |
| 2017/0066870 A1 | 3/2017 | Kolstad et al. | |
| 2017/0297256 A1 | 10/2017 | Kolstad et al. | |
| 2018/0141260 A1 | 5/2018 | Duncan et al. | |
| 2018/0244878 A1 | 8/2018 | Inagaki et al. | |
| 2018/0244913 A1 | 8/2018 | Mehta | |

(Continued)

FOREIGN PATENT DOCUMENTS

| | | |
|---|---|---|
| CN | 102 597 050 A | 7/2012 |
| CN | 103 570 925 A | 12/2014 |

(Continued)

OTHER PUBLICATIONS

CN Office Action dated Jul. 1, 2020 issued in Appl. No. 201780032952.3.
Wang et al., "Biobased copolyesters: synthesis, crystallization behavior, thermal and mechanical properties of poly (ethylene glycol sebacate-co-ethylene glycol 2,5-furan dicarboxylate)", RSC Adv., 2017, 7, 13798-13807.
Yu et al., "Chemosynthesis and Characterization of Fully Biomass-Based Copolymers of Ethylene Glycol, 2,5-Furandicarboxylic Acid, and Succinic Acid", J. Appl. Polym. Sci., vol. 130, No. 2, Oct. 15, 2013, pp. 1415.
XP002765188 Abstract for CN 10305700925A Shanghai Genious Advanced Material Co.

*Primary Examiner* — Liam J Heincer
(74) *Attorney, Agent, or Firm* — POLSINELLI PC

(57) ABSTRACT

This invention relates to a new polyester which is particularly suitable for use in the manufacture of mass-produced articles characterised by excellent mechanical properties, in particular high tensile strength and tensile modulus, associated with a high barrier property against oxygen and carbon dioxide.

22 Claims, No Drawings

(56) References Cited

U.S. PATENT DOCUMENTS

| | | |
|---|---|---|
| 2018/0258219 A1 | 9/2018 | Sipos |
| 2018/0265629 A1 | 9/2018 | Bissell, II et al. |
| 2018/0355101 A1 | 12/2018 | Jacquel et al. |
| 2019/0023838 A1 | 1/2019 | Janka et al. |
| 2019/0031826 A1 | 1/2019 | van Berkel |
| 2019/0202977 A1 | 7/2019 | Masuno et al. |
| 2019/0330172 A1 | 10/2019 | Nishimura et al. |

FOREIGN PATENT DOCUMENTS

| | | |
|---|---|---|
| CN | 104 185 655 A | 12/2014 |
| EP | 2 496 630 A1 | 12/2012 |
| WO | 2011054926 A1 | 12/2011 |

* cited by examiner

POLYESTER AND COMPOSITIONS CONTAINING IT

CROSS-REFERENCE TO RELATED APPLICATIONS

This application claims priority to and is a divisional of U.S. patent application Ser. No. 16/094,662, filed on Oct. 18, 2018, which is a National Phase filing under 35 U.S.C. § 371 of PCT/EP2017/059398, filed on Apr. 20, 2017; and this application claims priority to Application No. 102016000040946, filed in Italy on Apr. 20, 2016. The entire contents of each application are hereby incorporated by reference.

DESCRIPTION

This invention relates to a polyester characterised by substantial workability properties even when mixed with other polymers and characterised in that it is capable of being processed into products such as for example films, fibres, nonwoven fabrics, sheets, moulded, thermoformed, blow moulded and expanded articles characterised by excellent mechanical properties, in particular a high tensile strength and tensile modulus, associated with high bather properties against oxygen and carbon dioxide. This invention also relates to compositions and articles comprising the said polyesters.

Over the course of the years polymer materials have become increasingly widespread because of their versatility, the fact that they can be easily worked and their low cost.

For example, among thermoplastic polymer materials the development of new polyesters has been of particular significance. Polymer materials of this type have in fact found substantial use in the field of fibres, moulded and blow moulded and film articles.

The increasing use of polymer materials in ever more technologically advanced fields of application does however require that new materials capable of ensuring increasingly high performance during use be continuously developed.

For example, in the sector of thermoplastic polyesters for the production of packaging film one of the greater difficulties is that of obtaining products characterised by a good balance between toughness and deformability properties and the ability to withstand high loads.

In the sector of moulded articles on the other hand one of the greatest difficulties is to ensure high productivity, minimising the tendency of the manufactured articles to deform for example during the stage of cooling in the mould (known as mould shrinkage).

The problem underlying this invention is therefore that of finding a new polyester capable of ensuring high performance from the products obtained using it when in use, and in particular excellent workability and mechanical properties, in particular high tensile strength and tensile modulus, together with a high barrier property against oxygen and carbon dioxide.

Starting from this problem it has now surprisingly been found that by suitably selecting the type and composition of the monomers it is possible to obtain a polyester having the characteristics mentioned above.

In particular this invention relates to a polyester comprising:
a) a dicarboxylic component comprising, with respect to the total dicarboxylic component:
  a1) 99-85% in moles, preferably 98-86% in moles, more preferably 97-87% in moles, of units deriving from 2,5-furandicarboxylic acid or an ester thereof;
  a2) 1-15% in moles, preferably 2-14% in moles, more preferably 3-13% in moles, of units deriving from at least one saturated dicarboxylic acid selected from the group consisting of adipic acid, azelaic acid, sebacic acid, brassylic acid or an ester or derivative thereof, preferably azelaic acid;
  a3) 0-15% in moles, preferably 0-10% in moles, of units deriving from at least one aliphatic saturated dicarboxylic acid which is not the saturated dicarboxylic acid in component a2 and is preferably selected from the group consisting of saturated $C_2$-$C_{24}$, preferably $C_4$-$C_{13}$, more preferably $C_4$-$C_{11}$, dicarboxylic acids, or esters thereof
  a4) 0-5% in moles, preferably 0.1-1% in moles, more preferably 0.2-0.7% in moles, of units deriving from at least one unsaturated aliphatic dicarboxylic acid or an ester thereof;
b) a diol component comprising, with respect to the total diol component:
  b1) 95-100% in moles, of units deriving from 1,2-ethanediol;
  b2) 0-5% in moles, of units deriving from at least one saturated aliphatic diol which is not 1,2-ethanediol;
  b3) 0-5% in moles, preferably 0-3% in moles, of units deriving from at least one unsaturated aliphatic diol.

The saturated aliphatic dicarboxylic acids which are not the saturated dicarboxylic acid in component a2 (component a3 of the polyester according to this invention) are preferably selected from saturated $C_2$-$C_{24}$, preferably $C_4$-$C_{13}$, more preferably $C_4$-$C_{11}$, dicarboxylic acids, their $C_1$-$C_{24}$, preferably $C_1$-$C_4$, alkyl esters, their salts and mixtures thereof. The unsaturated aliphatic dicarboxylic acids (component a4 of the polyester according to the invention) are preferably selected from itaconic acid, fumaric acid, 4-methylene-pimelic acid, 3,4-bis (methylene) nonandioic acid, 5-methylene-nonandioic acid, their $C_1$-$C_{24}$, preferably $C_1$-$C_4$, alkyl esters, their salts and mixtures thereof. In a preferred embodiment of this invention the unsaturated aliphatic dicarboxylic acids comprise mixtures comprising at least 50% in moles, preferably more than 60% in moles, more preferably more than 65% in moles, of itaconic acid, its $C_1$-$C_{24}$, preferably $C_1$-$C_4$, esters. More preferably the unsaturated aliphatic dicarboxylic acids comprise itaconic acid.

As far as the saturated aliphatic diols which are not 1,2-ethanediol (component b2 of the polyester according to the invention) are concerned, these are preferably selected from 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexandimethanol, neopentylglycol, 2-methyl-1,3-propanediol, dianhydrosorbitol, dianhydromannitol, dianhydroiditol, cyclohexanediol, cyclohexanmethanediol, dialkylene glycols and polyalkylene glycols having a molecular weight of 100-4000, such as for example polyethylene glycol, polypropylene glycol and mixtures thereof. Preferably the diol component which is not 1,2-ethanediol comprises at least 50% in moles of one or more diols selected from 1,3-propanediol or 1,4-butanediol. More preferably the said diol component comprises or consists of 1,4-butanediol.

As far as the unsaturated aliphatic diols (component b3) of the polyester according to the invention) are concerned, these are preferably selected from cis 2-butene-1,4-diol, trans 2-butene-1,4-diol, 2-butyne-1,4-diol, cis 2-pentene-1, 5-diol, trans 2-pentene-1,5-diol, 2-pentyne-1,5-diol, cis 2-hexene-1,6-diol, trans 2-hexene-1,6-diol, 2-hexyne-1,6-diol, cis 3-hexene-1,6-diol, trans 3-hexene-1,6-diol, 3-hexyne-1,6-diol.

In addition to the dicarboxylic component and the diol component, the polyester of the composition according to this invention preferably comprises repetitive units deriving from at least one hydroxy acid in a quantity of between 0-49%, preferably between 0-30%, in moles with respect to the total moles of the dicarboxylic component. Examples of convenient hydroxy acids are glycolic, hydroxybutyric, hydroxycaproic, hydroxyvaleric, 7-hydroxyheptanoic, 8-hydroxycaproic or 9-hydroxynonanoic acids, lactic acid or lactides. The hydroxy acids may be inserted into the chain as such or may also have previously been caused to react with diacids or diols.

Long molecules with two functional groups, including functional groups which are not in the terminal position, may also be present in quantities not exceeding 10% in moles with respect to the total moles of the dicarboxylic component. Examples are dimer acids, ricinoleic acid and acids incorporating epoxy groups including polyoxyethylenes having molecular weights of between 200 and 10000.

Diamines, amino acids, and amino alcohols may also be present in percentages up to 30% in moles with respect to the total moles of the dicarboxylic component.

In the course of preparation of the polyester according to this invention one or more molecules with multiple functional groups may also advantageously be added in quantities of between 0.1 and 3% in moles with respect to the total moles of the dicarboxylic component (including any hydroxy acids) in order to obtain branched products. Examples of these molecules are glycerol, pentaerythritol, trimethylolpropane, citric acid, dipentaerythritol, acid triglycerides, polyglycerols.

The molecular weight Mn of the polyester according to this invention is preferably ≥20000, more preferably ≥40000. As far as the polydispersity index of the molecular weights, Mw/Mn, is concerned, this is instead preferably between 1.5 and 10, more preferably between 1.6 and 5 and even more preferably between 1.8 and 2.7.

Molecular weights Mn and Mw may be measured by gel permeation chromatography (GPC). The determination may be carried out with the chromatography system held at 40° C., using a set of three columns in series (particle diameter of 5 μm and porosities of 500 Å units, 10000 Å units and 100000 Å units respectively), a refractive index detector, hexafluoroisopropanol (HFIP) as eluent (flow 1 ml/min), using poly(methyl methacrylate) as the reference standard. Preferably the polyester having the composition according to this invention has an inherent viscosity of more than 0.3 dl/g, preferably between 0.3 and 2 dl/g, more preferably between 0.4 and 1.2 dl/g (measured using an Ubbelohde viscometer in 1:1 v/v dichloromethane-trifluoroacetic acid solution at a concentration of 0.5 g/dl at 25° C.).

The polyester having the composition according to this invention has a glass transition temperature ($T_g$) of between 35° C. and 90° C., measured by means of Differential Scanning calorimetry.

The polyesters according to this invention are characterized by high barrier properties against oxygen and carbon dioxide.

Preferably, the polyesters according to this invention have a permeability barrier against oxygen lower than 3 $(cm^3 \times mm)/(m^2 \times 24 \ h \times bar)$ measured at 23° C.—50% relative humidity according to standard ASTM F2622-08, and a permeability barrier against carbon dioxide lower than 12 $(cm^3 \times mm)/(m^2 \times 24 \ h \times bar)$ measured at 23° C.—50% relative humidity according to standard ASTM F2476-05.

The polyester according to this invention may be synthesised according to any one of the processes known in the state of the art. In particular they may be advantageously obtained by means of a polycondensation reaction.

Advantageously the process of synthesis may be carried out in the presence of a suitable catalyst. By way of suitable catalysts mention may be made by way of example of organometallic compounds of tin, for example stannoic acid derivatives, titanium compounds, for example orthobutyl titanate, aluminium compounds, for example triisopropyl Al, compounds of antimony, zinc and zirconium, and mixtures thereof.

The polyester according to this invention may also be used as a mixture which may also be obtained by reactive extrusion processes using one or more polymers of synthetic or natural origin, which may or may not be biodegradable, as well as one or more other components.

In a preferred embodiment this invention relates to compositions comprising:
i) 1-99%, preferably 5-95%, by weight with respect to the sum of components i.-v. of at least one polyester according to this invention;
ii) 99-1%, preferably 95-5%, by weight with respect to the sum of components i.-v. of at least one polymer which is not the polyester according to this invention (component i.), of synthetic or natural origin, which may or may not be biodegradable;
iii) 0-5%, preferably 0-0.5%, by weight with respect to the sum of components i.-v. of at least one cross-linking agent and/or one chain extender comprising at least one compound having two and/or multiple functional groups including isocyanate, peroxide, carbodiimide, isocyanurate, oxazoline, epoxide, anhydride or divinyl ether groups and mixtures thereof;
iv) 0-50%, preferably 0-40%, by weight with respect to the sum of components i.-v. of at least one filler;
v) 0-30% by weight with respect to the sum of components i.-v. of plant fibres.

As far as the polymers which are not the polyester according to this invention, of synthetic or natural origin, which may or may not be biodegradable (component ii of the composition according to this invention) are concerned, these are advantageously selected from the group consisting of polyhydroxyalkanoates, vinyl polymers, diacid diol polyesters which are not polyester i., polyamides, polyurethanes, polyethers, polyureas, polycarbonates and mixtures thereof.

As far as the polyhydroxyalkanoates are concerned, these are preferably selected from the group consisting of lactic acid polyesters, poly-δ-caprolactone, polyhydroxybutyrate, polyhydroxybutyrate-valerate, polyhydroxybutyrate-propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly-3-hydroxybutyrate-4-hydroxybutyrate. Preferably the polyhydroxyalkanoate in the composition comprises at least 80% by weight of one or more polyesters of lactic acid. In a preferred embodiment the said lactic acid polyesters are selected from the group consisting of poly-L-lactic acid, poly-D-lactic acid, the poly-D-L-lactic stereo complex, copolymers comprising more than 50% in moles of the said lactic acid polyesters or mixtures thereof. Particularly preferred are lactic acid polyesters containing at least 95% by weight of repetitive units deriving from L-lactic or D-lactic acids or combinations thereof having a molecular weight Mw of more than 50000 and a shear viscosity of between 50 and 500 Pa·s, preferably between 100 and 300 Pa·s (measured according to ASTM standard D3835 at T=190° C., shear rate=1000 s$^{-1}$, D=1 mm, L/D=10).

In a particularly preferred embodiment of the invention the lactic acid polyester comprises at least 95% by weight of units deriving from L-lactic acid, ≤5% of repetitive units deriving from D-lactic acid, has a melting point in the range 135-170° C., a glass transition temperature (Tg) in the range 55-65° C. and an MFR in the range 1-50 g/10 min (measured in accordance with standard ISO 1133-1 at 190° C. and 2.16 kg). Commercial examples of lactic acid polyesters having these properties are for example the products of the Ingeo™ Biopolymer 4043D, 3251D and 6202D make.

Of the vinyl polymers, those preferred are: polyethylene, polypropylene, their copolymers, polyvinyl alcohol, polyvinyl acetate, polyethylvinyl acetate and polyethylenevinyl alcohol, polystyrene, chlorinated vinyl polymers, polyacrylates.

Among the chlorinated vinyl polymers, those that are to be understood to be included here are, apart from polyvinyl chloride, polyvinylidene chloride, polyethylene chloride, poly(vinyl chloride—vinyl acetate), poly(vinyl chloride—ethylene), poly(vinyl chloride—propylene), poly(vinyl chloride—styrene), poly(vinyl chloride—isobutylene) and copolymers in which polyvinyl chloride represents more than 50% in moles. The said copolymers may be random, block or alternating copolymers.

As far as the diacid diol polyesters which are not polyester i. according to this invention are concerned, these are preferably selected from the group consisting of polyesters comprising:
  a) a dicarboxylic component comprising with respect to the total for the dicarboxylic component:
    a11) 0-40%, preferably 0-20%, in moles of one or more aromatic diacids, their esters or salts;
    a12) 60-100%, preferably 80-100%, in moles of one or more aliphatic diacids, their esters or salts;
    or
    a21) 40-95%, preferably 45-80%, in moles of one or more aromatic diacids, their esters or salts;
    a22) 5-60%, preferably 20-55%, in moles of one or more aliphatic diacids, their esters or salts;
    or
    a31) 95-100%, preferably 97-100%, in moles of one or more aromatic diacids, their esters or salts;
    a32) 0-5%, preferably 0-3%, in moles of one or more aliphatic diacids, their esters or salts;
  b) a diol component comprising derivative units with respect to the total for the diol component:
    b1) 95-100% in moles of units deriving from at least one saturated aliphatic diol;
    b2) 0-5% in moles of units deriving from at least one unsaturated aliphatic diol.

Preferably the aromatic dicarboxylic acids, saturated aliphatic dicarboxylic acids, unsaturated aliphatic dicarboxylic acids, saturated aliphatic diols and unsaturated aliphatic diols for the said polyesters are selected from those described above for the polyester according to this invention (component i.). More preferably the said diacid-diol polyesters which are not polyester i. are selected from the group consisting of poly(ethylene terephthalate), poly(propylene terephthalate), poly(butylene terephthalate), poly(ethylene 2,5-furandicarboxylate), poly(propylene 2,5-furandicarboxylate), poly(butylene 2,5-furandicarboxylate) and block or random copolymers of the poly(alkylene 2,5-furandicarboxylate-co-alkylene terephthalate), poly(alkylene alkylate), poly(alkylene terephthalate-co-alkylene alkylate) or poly(alkylene 2,5-furandicarboxylate-co-alkylene alkylate) type. Preferred examples of diol diacid polyesters which are not polyester i. are selected from the group consisting of: poly(1,4-butylene succinate), poly(1,2-ethylene succinate), poly(1,4-butylene adipate), poly(1,2-ethylene adipate), poly(1,4-butylene azelate), poly(1,2-ethylene azelate), poly(1,4-butylene sebacate), poly(1,2-ethylene succinate-co-1,4-butylene succinate), poly(1,2-ethylene adipate-co-1,4-butylene adipate), poly(1,2-ethylene azelate-co-1,4-butylene azelate), poly(1,2-ethylene sebacate-co-1,4-butylene sebacate), poly(1,2-ethylene succinate-co-1,4-butylene adipate), poly(1,2-ethylene succinate-co-1,4-butylene azelate), poly(1,2-ethylene succinate-co-1,4-butylene sebacate), poly(1,2-ethylene adipate-co-1,4-butylene succinate), poly(1,2-ethylene adipate-co-1,4-butylene azelate), poly(1,2-ethylene adipate-co-1,4-butylene sebacate), poly(1,2-ethylene azelate-co-1,4-butylene succinate), poly(1,2-ethylene azelate-co-1,4-butylene adipate), poly(1,2-ethylene sebacate-co-1,4-butylene succinate), poly(1,2-ethylene sebacate-co-1,4-butylene adipate), poly(1,2-ethylene sebacate-co-1,4-butylene azelate), poly(1,4-butylene adipate-co-1,4-butylene succinate), poly(1,4-butylene azelate-co-1,4-butylene succinate), poly(1,4-butylene sebacate-co-1,4-butylene succinate), poly(1,4-butylene succinate-co-1,4-butylene adipate-co-1,4-butylene azelate), poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate), poly(1,4-butylene adipate-co-1,4-butylene 2,5-furandicarboxylate), poly(1,4-butylene sebacate-co-1,4-butylene 2,5-furandicarboxylate), poly(1,4-butylene azelate-co-1,4-butylene 2,5-furandicarboxylate), poly(1,4-butylene brassylate-co-1,4-butylene 2,5-furandicarboxylate), poly(1,4-butylene succinate-co-1,4-butylene 2,5-furandicarboxylate), poly(1,4-butylene adipate-co-1,4-butylene sebacate-co-1,4-butylene 2,5-furandicarboxylate), poly(1,4-butylene azelate-co-1,4-butylene sebacate-co-1,4-butylene 2,5-furandicarboxylate), poly(1,4-butylene adipate-co-1,4-butylene azelate-co-1,4-butylene 2,5-furandicarboxylate), poly(1,4-butylene succinate-co-1,4-butylene sebacate-co-1,4-butylene 2,5-furandicarboxylate), poly(1,4-butylene adipate-co-1,4-butylene succinate-co-1,4-butylene 2,5-furandicarboxylate), poly(1,4-butylene azelate-co-1,4-butylene succinate-co-1,4-butylene 2,5-furandicarboxylate), their copolymers and mixtures.

In a further preferred embodiment of this invention, the said diacid diol polyesters which are not polyester i. are selected from the group consisting of:
  (A) polyesters comprising repetitive units deriving from aromatic dicarboxylic acids of the phthalic acid type, preferably terephthalic acid, aliphatic dicarboxylic acids and aliphatic diols (AAPE-A) characterised by an aromatic units content of between 35 and 60% in moles, preferably between 40 and 55% in moles with respect to the total moles of the dicarboxylic component. AAPE-A polyesters are preferably selected from: poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate).

(B) polyesters comprising repetitive units deriving from heterocyclic dicarboxylic aromatic compounds, preferably 2,5-furandicarboxylic acid, aliphatic dicarboxylic acids and aliphatic diols (AAPE-B) characterised by an aromatic units content of between 50 and 80% in moles, preferably between 60 and 75% in moles, with respect to the total moles of the dicarboxylic component. AAPE-B polyesters are preferably selected from: poly(1,4-butylene adipate-co-1,4-butylene 2,5-furandicarboxylate), poly(1,4-butylene sebacate-co-1,4-butylene 2,5-furandicarboxylate), poly(1,4-butylene azelate-co-1,4-butylene 2,5-furandicarboxylate), poly(1,4-butylene brassylate-co-1,4-butylene 2,5-furandicarboxylate), poly(1,4-butylene succinate-co-1,4-butylene 2,5-furandicarboxylate), poly(1,4-butylene adipate-co-1,4-butylene sebacate-co-1,4-butylene 2,5-furandicarboxylate), poly(1,4-butylene azelate-co-1,4-butylene sebacate-co-1,4-butylene 2,5-furandicarboxylate), poly(1,4-butylene adipate-co-1,4-butylene azelate-co-1,4-butylene 2,5-furandicarboxylate), poly(1,4-butylene succinate-co-1,4-butylene sebacate-co-1,4-butylene 2,5-furandicarboxylate), poly(1,4-butylene adipate-co-1,4-butylene succinate-co-1,4-butylene 2,5-furandicarboxylate), poly(1,4-butylene azelate-co-1,4-butylene succinate-co-1,4-butylene 2,5-furandicarboxylate).

As far as the polyamides in the composition according to this invention are concerned, these are preferably selected from the group consisting of polyamides 6 and 6,6, polyamides 9 and 9,9, polyamides 10 and 10,10, polyamides 11 and 11,11, polyamides 12 and 12,12 and their combinations of the 6/9, 6/10, 6/11, 6/12 type, their mixtures and both random and block copolymers.

Preferably the polycarbonates in the composition according to this invention are selected from the group consisting of polyalkylene carbonates, more preferably polyethylene carbonates, polypropylene carbonates, polybutylene carbonates, their mixtures and random and block copolymers.

Among the polyethers, those preferred are those selected from the group consisting of polyethylene glycols, polypropylene glycols, polybutylene glycols, their copolymers and mixtures having molecular weights from 70000 to 500000.

In the composition according to this invention the cross-linking agent and/or chain extender (component iii.) improves stability to hydrolysis and is selected from compounds having two and/or multiple functional groups including isocyanate, peroxide, carbodiimide, isocyanurate, oxazoline, epoxide, anhydride or divinyl ether groups and mixtures thereof. Preferably the cross-linking agent and/or chain extender comprises at least one compound containing two and/or multiple functional groups including isocyanate groups. More preferably the cross-linking agent and/or chain extender comprises at least 25% by weight of one or more compounds having two and/or multiple functional groups including isocyanate groups. Particularly preferred are mixtures of compounds having two and/or multiple functional groups including isocyanate groups with compounds having two and/or multiple functional groups including epoxide groups, even more preferably comprising at least 75% by weight of compounds having two and/or multiple functional groups including isocyanate groups.

The compounds with two and multiple functional groups including isocyanate groups are preferably selected from p-phenylene diisocyanate, 2,4-toluene diisocyanate, 2,6-toluene diisocyanate, 4,4-diphenylmethane-diisocyanate, 1,3-phenylene-4-chloro diisocyanate, 1,5-naphthalene diisocyanate, 4,4-diphenylene diisocyanate, 3,3'-dimethyl-4,4-diphenylmethane diisocyanate, 3-methyl-4,4'-diphenylmethane diisocyanate, diphenylester diisocyanate, 2,4-cyclohexane diisocyanate, 2,3-cyclohexane diisocyanate, 1-methyl 2,4-cyclohexyl diisocyanate, 1-methyl 2,6-cyclohexyl diisocyanate, bis-(isocyanate cyclohexyl) methane, 2,4,6-toluene triisocyanate, 2,4,4-diphenylether triisocyanate, polymethylene-polyphenyl-polyisocyanates, methylene diphenyl diisocyanate, triphenylmethane triisocyanate, 3,3'-ditolylene-4,4-diisocyanate, 4,4'-methylene bis(2-methyl-phenyl isocyanate), hexamethylene diisocyanate, 1,3-cyclohexylene diisocyanate, 1,2-cyclohexylene diisocyanate and their mixtures. In a preferred embodiment the compound including isocyanate groups is 4,4-diphenylmethane-diisocyanate.

As far as the compounds with two and multiple functional groups incorporating peroxide groups are concerned, these are preferably selected from benzoyl peroxide, lauroyl peroxide, isononanoyl peroxide, di-(t-butylperoxyisopropyl) benzene, t-butyl peroxide, dicumyl peroxide, alpha,alpha'-di(t-butylperoxy) diisopropyl benzene, 2,5-dimethyl-2,5di(t-butylperoxy) hexane, t-butyl cumyl peroxide, di-t-butylperoxide, 2,5-dimethyl-2,5-di(t-butylperoxy) hex-3-yne, di(4-t-butylcyclohexyl) peroxydicarbonate, dicetyl peroxydicarbonate, dimyristyl peroxydicarbonate, 3,6,9-triethyl-3,6,9-trimethyl-1,4,7-triperoxonane, di(2-ethylhexyl) peroxydicarbonate and their mixtures.

The compounds with two and multiple functional groups including carbodiimide groups which are preferably used in the composition according to this invention are selected from poly(cyclooctylene carbodiimide), poly(1,4-dimethylenecyclohexylene carbodiimide), poly(cyclohexylene carbodiimide), poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6'-tetra isopropyl diphenylene carbodiimide) (Stabaxol® D), poly(2,4,6-triisopropyl-1,3-phenylene carbodiimide) (Stabaxol® P-100), poly(2,6 diisopropyl-1,3-phenylene carbodiimide) (Stabaxol® P), poly(tolyl carbodiimide), poly(4,4'-diphenyl methane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenyl methane carbodiimide), poly(naphthalene carbodiimide), poly(isophorone carbodiimide), poly(cumene carbodiimide), p-phenylene bis(ethyl carbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis(ethylcarbodiimide) and their mixtures.

Examples of compounds with two and multiple functional groups including epoxide groups which can advantageously be used in the composition according to this invention are all the polyepoxides from epoxylated oils and/or styrene—glycidyl ether—methyl methacrylate, glycidyl ether methyl methacrylate, included in a range of molecular weights from 1000 to 10000 and having an epoxide number per molecule in the range from 1 to 30 and preferably from 5 to 25, and epoxides selected from the group comprising: diethylene glycol diglycidyl ether, polyethylene glycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxides, 1,4-cyclohexandimethanol diglycidyl ether, glycidyl 2-methylphenyl ether, glycerol propoxylatotriglycidyl ether, 1,4-butanediol diglycidyl ether, sorbitol polyglycidyl ether, glycerol diglycidyl ether, meta-xylene diamine tetraglycidyl ether and bisphenol A diglycidyl ether and their mixtures.

Catalysts may also be used together with the compounds with two and multiple functional groups including isocyanate, peroxide, carbodiimide, isocyanurate, oxazoline, epoxide, anhydride and divinyl ether groups in the composition according to this invention to increase the reactivity of the reactive groups. Salts of fatty acids, even more preferably calcium and zinc stearates, are preferably used in the case of polyepoxides.

In a particularly preferred embodiment of the invention the cross-linking agent and/or chain extender in the composition comprises compounds including isocyanate groups, preferably 4,4-diphenylmethane-diisocyanate, and/or including carbodiimide groups, and/or including epoxide groups, preferably of the styrene-glycidylether-methylmethacrylate type.

In the composition according to this invention the filler (component iv.) helps to improve dimensional stability and is preferably selected from kaolin, barytes, clay, talc, calcium and magnesium, iron and lead carbonates, aluminium hydroxide, diatomaceous earth, aluminium sulfate, barium sulfate, silica, mica, titanium dioxide, wollastonite, starch, chitin, chitosan, alginates, proteins such as gluten, zein, casein, collagen, gelatin, natural gums, rosinic acids and their derivatives.

By the term starch is here meant all types of starch, that is: flour, native starch, hydrolysed starch, destructured starch, gelatinised starch, plasticised starch, thermoplastic starch, biofillers comprising complexed starch or mixtures thereof. Particularly suitable according to the invention are starches such as potato, maize, tapioca and pea starch.

Starches which can be easily destructured and which have high initial molecular weights, such as for example potato or maize starch, have proved to be particularly advantageous.

The starch may be present as such or in a chemically modified form, such as for example in the form of starch esters with a degree of substitution of between 0.2 and 2.5, hydroxypropylate starch, or starch modified with fatty chains.

By destructured starch reference is made here to the teaching included in Patents EP-0 118 240 and EP-0 327 505, such starch meaning starch which has been processed so as to be substantially free of the so-called "Maltese crosses" under an optical microscope in polarised light and the so-called "ghosts" under a phase contrast optical microscope.

Advantageously the starch is destructured by means of an extrusion process at temperatures between 110 and 250° C., preferably 130-180° C., pressures preferably between 0.1 and 7 MPa, preferably 0.3-6 MPa, preferably providing a specific energy of more than 0.1 kWh/kg during the said extrusion.

The starch is preferably destructured in the presence of 1-40% by weight with respect to the weight of the starch of one or more plasticisers selected from water and polyols having from 2 to 22 carbon atoms. As far as the water is concerned, this may also be that naturally present in the starch. Among the polyols, those preferred are polyols having from 1 to 20 hydroxyl groups containing from 2 to 6 carbon atoms, their ethers, thioethers and organic and inorganic esters. Examples of polyols are glycerine, diglycerol, polyglycerol, pentaerythritol, polyglycerol ethoxylate, ethylene glycol, polyethylene glycol, 1,2-propanediol, 1,3-propanediol, 1,4-butanediol, neopentyl glycol, sorbitol monoacetate, sorbitol diacetate, sorbitol monoethoxylate, sorbitol diethoxylate, and mixtures thereof. In a preferred embodiment the starch is destructured in the presence of glycerol or a mixture of plasticisers comprising glycerol, more preferably containing between 2 and 90% by weight of glycerol. Preferably the destructured and cross-linked starch according to this invention comprises between 1 and 40% by weight of plasticisers with respect to the weight of the starch.

When present the starch in the composition is preferably in the form of particles having a circular or elliptical cross-section or a cross-section which can in any event be likened to an ellipse having an arithmetic mean diameter of less than 1 micron and preferably less than 0.5 μm mean diameter, measured taking the major axis of the particle into consideration.

In a preferred embodiment of this invention the filler comprises talc, calcium carbonate or mixtures thereof, present in the form of particles having a mean arithmetic diameter of less than 10 microns, measured taking the major axis of the particles into consideration. It has in fact been discovered that fillers of the abovementioned type not characterised by the said mean arithmetic diameter improve significantly less the disintegratability characteristics, during industrial composting, of the moulded objects comprising them. Without wishing to be bound to any specific theory, it is felt that when used in the compositions according to the invention, the said fillers become stratified and agglomerate during the moulding stage, thus slowing down the action of the agents responsible for disintegration of the moulded articles.

In the composition according to this invention the plant fibres (component v.) are preferably selected from cellulose fibres, wood flour, cannabis fibres, lignocellulose residues originating from raw materials of plant origin, such as for example thistle and sunflower plants, and grass cuttings.

The polymer composition according to this invention preferably comprises up to 30% by weight of plant fibre (component v.). It has in fact been found that such a content has the effect of significantly improving the disintegratability characteristics of the polymer composition, while at the same time making it possible to manufacture articles having a high heat deflection temperature under load and particularly high dimensional stability, thus making it possible to prepare compositions which are also devoid of fillers.

In a preferred embodiment the composition according to this invention comprises from 5 to 25% by weight of plant fibre and does not contain fillers (component iv.). In particular this plant fibre content is particularly suitable for use in the composition according to this invention in injection moulding techniques.

By "dimensional stability" is meant the ability of an object to maintain its original shape over time and following annealing treatment.

It has also unexpectedly been found that the use of plant fibres having a length/diameter (i.e. L/D) ratio<40, preferably L/D<30 and even more preferably L/D<20, has proved to be particularly advantageous, because in addition to contributing to the abovementioned dimensional stability and high heat deflection temperature properties it does not give rise to excessive increases in tensile modulus or significant decreases in deformation of the polymer composition on failure, or an appreciable reduction in its flowability in the molten state.

Particularly preferred examples of compositions according to this invention are:

Compositions A, comprising:
i) 1-40%, preferably 5-35%, by weight with respect to the sum of components i.-v. of at least one polyester according to this invention;
ii) 30-95%, preferably 35-90%, by weight with respect to the sum of the components i.-v. of at least one polymer which is not the polyester according to this invention (component i.) of synthetic or natural origin, which may or may not be biodegradable, in which the said component ii. comprises at least one diacid diol polyester of the abovementioned aliphatic-aromatic type;
iii) 0-5%, preferably 0-0.5%, by weight with respect to the sum of components i.-v. of at least one cross-linking agent and/or one chain extender comprising at least one compound having two and/or multiple functional groups including isocyanate, peroxide, carbodiimide, isocyanurate, oxazoline, epoxide, anhydride or divinyl ether groups and mixtures thereof;
iv) 0.1-50% by weight with respect to the sum of components i.-v. of at least one filler, in which the said filler comprises destructured starch;
v) 0-30% by weight with respect to the sum of components i.-v. of plant fibres.

Compositions B, comprising:
i) 1-40%, preferably 2-35%, by weight with respect to the sum of components i.-v. of at least one polyester according to this invention;
ii) 30-95%, preferably 32-90%, by weight with respect to the sum of components i.-v. of at least one polymer which is not the polyester according to this invention (component i.), of synthetic or natural origin, which may or may not be biodegradable, in which the said component ii. comprises at least one diacid-diol polyester of the abovementioned aliphatic type;
iii) 0-5%, preferably 0-0.5%, by weight with respect to the sum of components i.-v. of at least one cross-linking agent and/or a chain extender comprising at least one compound having two and/or multiple functional groups including isocyanate, peroxide, carbodiimide, isocyanurate, oxazoline, epoxide, anhydride or divinyl ether groups and mixtures thereof;
iv) 0.1-50%, preferably 0.2-30%, by weight with respect to the sum of components i.-v. of at least one filler, in which the said filler comprises destructured starch;
v) 0-30% by weight with respect to the sum of components i.-v. of plant fibres.

Compositions C, comprising:
i) 30-70%, preferably 40-60%, by weight with respect to the sum of components i.-v. of at least one polyester according to this invention;
ii) 30-70%, preferably 40-60%, by weight with respect to the sum of components i.-v. of at least one polymer which is not the polyester according to this invention (component i.), of synthetic or natural origin, which may or may not be biodegradable, in which the said component ii. comprises at least one diacid diol polyester of the abovementioned aliphatic-aromatic type;
iii) 0-5%, preferably 0-0.5%, by weight with respect to the sum of components i.-v. of at least one cross-linking agent and/or a chain extender comprising at least one compound having two and/or multiple functional groups including isocyanate, peroxide, carbodiimide, isocyanurate, oxazoline, epoxide, anhydride or divinyl ether groups and mixtures thereof;
iv) 0-50%, preferably 0-40%, by weight with respect to the sum of components i.-v. of at least one filler;
v) 0-30% by weight with respect to the sum of components i.-v. of plant fibres.

Compositions D, comprising:
i) 1-50%, preferably 2-45%, by weight with respect to the sum of components i.-v. of at least one polyester according to this invention;
ii) 50-99%, preferably 55-98%, by weight with respect to the sum of components i.-v. of at least one polymer which is not the polyester according to this invention (component i.), of synthetic or natural origin, which may or may not be biodegradable, in which the said component ii. comprises at least one diacid diol polyester of the abovementioned aliphatic-aromatic type;
iii) 0-5%, preferably 0-0.5%, by weight with respect to the sum of components i.-v. of at least one cross-linking agent and/or a chain extender comprising at least one compound having two and/or multiple functional groups including isocyanate, peroxide, carbodiimide, isocyanurate, oxazoline, epoxide, anhydride or divinyl ether groups and mixtures thereof;
iv) 0-50%, preferably 0-40%, by weight with respect to the sum of components i.-v. of at least one filler;
v) 0-30% by weight with respect to the sum of components i.-v. of plant fibres.

Compositions E, comprising:
i) 50-99%, preferably 55-95%, by weight with respect to the sum of components i.-v. of at least one polyester according to this invention;
ii) 1-50%, preferably 5-45%, by weight with respect to the sum of components i.-v. of at least one polymer which is not the polyester according to this invention (component i.), of synthetic or natural origin, which may or may not be biodegradable, in which the said component ii. comprises at least one diacid diol polyester of the abovementioned aliphatic-aromatic type;
iii) 0-5%, preferably 0-0.5%, by weight with respect to the sum of components i.-v. of at least one cross-linking agent and/or a chain extender comprising at least one compound having two and/or multiple functional groups including isocyanate, peroxide, carbodiimide, isocyanurate, oxazoline, epoxide, anhydride or divinyl ether groups and mixtures thereof;
iv) 0-50%, preferably 0-40%, by weight with respect to the sum of components i.-v. of at least one filler;
v) 0-30% by weight with respect to the sum of components i.-v. of plant fibres.

Compositions F, comprising:
i) 40-99%, preferably 45-95%, by weight with respect to the sum of components i.-v. of at least one polyester according to this invention;
ii) 1-60%, preferably 5-55%, by weight with respect to the sum of components i.-v. of at least one polymer which is not the polyester according to this invention (component i.), of synthetic or natural origin, which may or may not be biodegradable, in which the said component ii. comprises at least one diacid diol polyester of the abovementioned aliphatic type;
iii) 0-5%, preferably 0-0.5%, by weight with respect to the sum of components i.-v. of at least one cross-linking agent and/or a chain extender comprising at least one compound having two and/or multiple functional groups including isocyanate, peroxide, carbodiimide, isocyanurate, oxazoline, epoxide, anhydride or divinyl ether groups and mixtures thereof;
iv) 0-50%, preferably 0-40%, by weight with respect to the sum of components i.-v. of at least one filler;
v) 0-30% by weight with respect to the sum of components i.-v. of plant fibres.

Compositions G, comprising:
i) 1-60%, preferably 5-55%, by weight with respect to the sum of components i.-v. of at least one polyester according to this invention;
ii) 40-99%, preferably 45-95%, by weight with respect to the sum of components i.-v. of at least one polymer which is not the polyester according to this invention (component i.), of synthetic or natural origin, which may or may not be biodegradable, in which the said component ii. comprises at least one diacid diol polyester of the abovementioned aliphatic type;
iii) 0-5%, preferably 0-0.5%, by weight with respect to the sum of components i.-v. of at least one cross-linking agent and/or a chain extender comprising at least one compound having two and/or multiple functional groups including isocyanate, peroxide, carbodiimide, isocyanurate, oxazoline, epoxide, anhydride or divinyl ether groups and mixtures thereof;
iv) 0-50%, preferably 0-40%, by weight with respect to the sum of components i.-v. of at least one filler;
v) 0-30% by weight with respect to the sum of components i.-v. of plant fibres.

Compositions H, comprising:
i) 30-70%, preferably 35-65%, by weight with respect to the sum of components i.-v. of at least one polyester according to this invention;
ii) 0-15%, preferably 0-10%, by weight with respect to the sum of components i.-v. of at least one polymer which is not the polyester according to this invention (component i.), of synthetic or natural origin, which may or may not be biodegradable;
iii) 0-5%, preferably 0-0.5%, by weight with respect to the sum of components i.-v. of at least one cross-linking agent and/or chain extender comprising at least one compound having two and/or multiple functional groups including isocyanate, peroxide, carbodiimide, isocyanurate, oxazoline, epoxide, anhydride or divinyl ether groups and mixtures thereof;
iv) 70-30%, preferably 60-40%, by weight with respect to the sum of components i.-v. of at least one filler, in which the said filler comprises at least one selected from the group consisting of kaolin, barytes, clay, talc, calcium and magnesium, iron and lead carbonates, aluminium hydroxide, diatomaceous earth, aluminium sulfate, barium sulfate, silica, mica, titanium dioxide, wollastonite or mixtures thereof;
v) 0-30% by weight with respect to the sum of components i.-v. of plant fibres.

Compositions I, comprising:
i) 50-99%, preferably 55-95%, by weight with respect to the sum of components i.-v. of at least one polyester according to this invention;
ii) 0-15%, preferably 0-10%, by weight with respect to the sum of components i.-v. of at least one polymer which is not the polyester according to this invention (component i.), of synthetic or natural origin, which may or may not be biodegradable;
iii) 0-5%, preferably 0-0.5%, by weight with respect to the sum of components i.-v. of at least one cross-linking agent and/or chain extender comprising at least one compound having two and/or multiple functional groups including isocyanate, peroxide, carbodiimide, isocyanurate, oxazoline, epoxide, anhydride or divinyl ether groups and mixtures thereof;
iv) 1-50%, preferably 2-30%, by weight with respect to the sum of components i.-v. of at least one filler, in which the said filler comprises at least one selected from the group comprising kaolin, barytes, clay, talc, calcium and magnesium, iron and lead carbonates, aluminium hydroxide, diatomaceous earth, aluminium sulfate, barium sulfate, silica, mica, titanium dioxide, wollastonite or mixtures thereof;
v) 0-30% by weight with respect to the sum of components i.-v. of plant fibres.

Compositions J, comprising:
i) 30-70%, preferably 35-65%, by weight with respect to the sum of components i.-v. of at least one polyester according to this invention;
ii) 70-30%, preferably 65-35%, by weight with respect to the sum of components i.-v. of at least one polymer which is not the polyester according to this invention (component i.), of synthetic or natural origin, which may or may not be biodegradable, in which the said component ii. comprises at least one polyhydroxy alkanoate;
iii) 0-5%, preferably 0-0.5%, by weight with respect to the sum of components i.-v. of at least one cross-linking agent and/or chain extender comprising at least one compound having two and/or multiple functional groups including isocyanate, peroxide, carbodiimide, isocyanurate, oxazoline, epoxide, anhydride or divinyl ether groups and mixtures thereof;
iv) 0-50% by weight with respect to the sum of components i.-v. of at least one filler;
v) 0-30% by weight with respect to the sum of components i.-v. of plant fibres.

Compositions K, comprising:
i) 1-50%, preferably 5-45%, by weight with respect to the sum of components i.-v. of at least one polyester according to this invention;
ii) 50-99%, preferably 55-95%, by weight with respect to the sum of components i.-v. of at least one polymer which is not the polyester according to this invention (component i.), of synthetic or natural origin, which may or may not be biodegradable, in which the said component ii. comprises at least one polyhydroxy alkanoate;
iii) 0-5%, preferably 0-0.5%, by weight with respect to the sum of components i.-v. of at least one cross-linking agent and/or chain extender comprising at least one compound having two and/or multiple functional groups including isocyanate, peroxide, carbodiimide, isocyanurate, oxazoline, epoxide, anhydride or divinyl ether groups and mixtures thereof;
iv) 0-50%, preferably 0-30%, by weight with respect to the sum of components i.-v. of at least one filler;
v) 0-30% by weight with respect to the sum of components i.-v. of plant fibres.

Compositions L, comprising:
i) 50-99%, preferably 55-95%, by weight with respect to the sum of components i.-v. of at least one polyester according to this invention;
ii) 1-50%, preferably 5-45%, by weight with respect to the sum of components i.-v. of at least one polymer which is not the polyester according to this invention (component i.), of synthetic or natural origin, which may or may not be biodegradable, in which the said component ii. comprises at least one polyhydroxy alkanoate;
iii) 0-5%, preferably 0-0.5%, by weight with respect to the sum of components i.-v. of at least one cross-linking agent and/or chain extender comprising at least one compound having two and/or multiple functional groups including isocyanate, peroxide, carbodiimide, isocyanurate, oxazoline, epoxide, anhydride or divinyl ether groups and mixtures thereof;
iv) 0-50%, preferably 0.5-30%, by weight with respect to the sum of components i.-v. of at least one filler;
v) 0-30% by weight with respect to the sum of components i.-v. of plant fibres.

In addition to the components i.-v. the composition according to this invention preferably also comprises at least one other component selected from the group consisting of plasticisers, UV stabilisers, lubricants, nucleating agents, surfactants, antistatic agents, pigments, flame retardant agents, compatibilising agents, lignin, organic acids, anti-oxidants, anti-mould agents, waxes and process coadjuvants.

As far as plasticisers are concerned, in the composition according to this invention there are preferably present, in addition to any plasticisers preferably used for preparation of the destructured starch and described above, one or more plasticisers selected from the group consisting of phthalates, such as for example diisononyl phthalate, trimellitates, such as for example esters of trimellitic acid with $C_4$-$C_{20}$ mono-alcohols preferably selected from the group consisting of n-octanol and n-decanol, and aliphatic esters having the following structure:

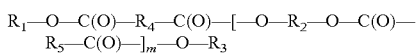

in which:
$R_1$ is selected from one or more groups comprising H, saturated and unsaturated linear and branched alkyl residues of the $C_1$-$C_{24}$ type, polyol residues esterified with $C_1$-$C_{24}$ monocarboxylic acids;
$R_2$ comprises —$CH_2$—$C(CH_3)_2$—$CH_2$— groups and $C_2$-$C_8$ alkylene groups, and comprises at least 50% in moles of the said —$CH_2$—$C(CH_3)_2$—$CH_2$— groups;
$R_3$ is selected from one or more of the groups comprising H, saturated and unsaturated linear and branched alkyl residues of the $C_1$-$C_{24}$ type, polyol residues esterified with $C_1$-$C_{24}$ monocarboxylic acids;
$R_4$ and $R_5$ are the same or different and comprise one or more $C_2$-$C_{22}$, preferably $C_2$-$C_{11}$, more preferably $C_4$-$C_9$, alkylenes and comprise at least 50% in moles of $C_7$ alkylenes,
m is a number of between 1 and 20, preferably 2-10, more preferably 3-7. Preferably in the said esters at least one of the $R_1$ and/or $R_3$ groups comprises polyol residues esterified with at least one $C_1$-$C_{24}$ monocarboxylic acid selected from the group consisting of stearic acid, palmitic acid, 9-ketostearic acid, 10-ketostearic acid and mixtures thereof, preferably in quantities ≥10% in moles, more preferably ≥20%, even more preferably ≥25% in moles with respect to the total quantity of $R_1$ and/or $R_3$ groups. Examples of aliphatic esters of this type are described in Italian patent application MI2014A000030 and in PCT applications PCT/EP2015/050336, PCT/EP2015/050338.

When present the selected plasticisers are preferably present up to 10% by weight with respect to the total weight of the composition.

Lubricants are preferably selected from esters and the metal salts of fatty acids such as for example zinc stearate, calcium stearate, aluminium stearate and acetyl stearate. Preferably the composition according to this invention comprises up to 1% by weight of lubricants, more preferably up to 0.5% by weight, with respect to the total weight of the composition.

Examples of nucleating agents include the sodium salt of saccharin, calcium silicate, sodium benzoate, calcium titanate, boron nitride, isotactic polypropylene and low molecular weight PLA. These additives are preferably added in quantities up to 10% by weight and more preferably between 2 and 6% by weight with respect to the total weight of the composition. Pigments may also be added if necessary, for example titanium dioxide, clays, copper phthalocyanine, iron silicates, oxides and hydroxides, carbon black, and magnesium oxide. These additives are preferably added up to 10% by weight.

The process of producing the compounds comprising the polyester according to this invention may take place according to any one of the processes known in the state of the art. Advantageously the said compositions are obtained through extrusion processes in which the polymer components are mixed in the molten state. When extruding the composition the components may be fed all together or one or more of them may be fed separately along the extruder.

The polyester according to the invention is extremely suitable for use, alone or in the form of compositions of the type described above for example, in numerous practical applications for the manufacture of products such as for example films, fibres, nonwoven fabrics, sheets, moulded, thermoformed, blown or expanded articles and laminated articles including using the extrusion coating technique.

This invention also relates to articles comprising the polyester according to this invention.

Examples of products comprising the polyester according to this invention are:
- films, both mono- and bi-oriented, and multilayer film with other polymer materials;
- stretch film including clingfilm for foodstuffs, for bales in agriculture and for wrapping refuse;
- thermoformed food packaging, both monolayer and multilayer, such as for example containers for milk, yoghurt, meat, beverages, etc.;
- coatings obtained using the extrusion coating technique;
- multilayer laminates with layers of paper, plastics, aluminium, metallised films;
- expanded or expandable beads for the production of parts formed by sintering;
- expanded and semi-expanded products including expanded blocks formed by pre-expanded particles;
- expanded sheets, thermoformed expanded sheets, containers obtained from these for food packaging;
- containers in general for fruit and vegetables;
- composites with gelatinised, destructured and/or complexed starch, natural starch, flours, other fillers of natural plant or inorganic origin, as fillers;
- containers for beverages, such as for example bottles, etc.;
- fibres, microfibres, composite fibres with a core comprising rigid polymers such as PLA, PET, PTT, etc., and an outer shell in the material of the invention, deblens composite fibres, fibres having various cross-sections from round to multilobate, floc fibres, fabrics and nonwoven spun bonded or thermobonded fabrics for the sanitary, health, agriculture and clothing sectors.

It may also be used in applications as a replacement for plasticised PVC.

The polyester according to this invention and compositions comprising it are also particularly suitable for use in injection moulding and thermoforming, and spinning The characteristics of the polyester according to this invention in fact make it possible to manufacture injection moulded or thermoformed articles having a high heat deflection temperature (HDT) and high dimensional stability. For example the polyester according to this invention and compositions comprising it are particularly suitable for the production of disposable cutlery, plates and cups, rigid containers, capsules for the delivery of beverages, preferably hot beverages, caps and covers, and packaging for food which can be heated in conventional and microwave ovens.

In a preferred embodiment of this invention, the said thermoformed articles comprise at least one layer A comprising or consisting of a composition which comprises or consists of the polyester according to this invention and at least one layer B comprising at least one polymer selected from the group comprising diacid diol polyesters and hydroxy acid polyesters, and are preferably characterised by a mutual arrangement of the said layers A and B selected from A/B, A/B/A and B/A/B. In a further particularly preferred embodiment, said layer B comprises a lactic acid polyester.

As far as the process of moulding by thermoforming is concerned, the polyester according to this invention and compositions containing it may be moulded in accordance with methods known to those skilled in the art, starting for example from sheets, slabs or film, under pressure or under vacuum. This invention also relates to the said sheets, slabs or films comprising the polyester according to this invention and compositions including it used for the production of articles moulded by thermoforming.

Typical thermoforming operating conditions provide for example for a sheet, slab or film heating time of 5-8 seconds up to softening, and moulding times of between 15 and 20 seconds.

As far as injection moulding is concerned, the polyester according to this invention and compositions containing it have the further advantage that they can be fed to conventional machinery without requiring substantial changes to normal working conditions, in comparison with other conventional polymers such as for example polyethylene, polypropylene, polystyrene and ABS. Preferably, in the case of objects having a maximum thickness of the order of 1 millimetre, these may be moulded using a melt temperature of 200-240° C., an oleodynamic pressure from 7 to 110 bar, a cooling time of 3 to 15 seconds and a cycle time of 10-30 seconds.

In a particularly preferred embodiment the injection moulded articles comprising the polyester according to this invention undergo hot annealing treatments at temperatures between 70 and 150° C. This invention also relates to articles obtained by means of annealing treatments (known as annealed products).

The said annealing treatments may advantageously be carried out in unconfined environments at constant temperature, for example within stoves. In this case the annealing treatments are preferably carried out at temperatures between 80 and 150° C. and with residence times of 30 sec-60 min, preferably 40 sec-30 min and even more preferably 40 sec-5 min, thus being particularly advantageous from the production point of view. The specific conditions which have to be used will vary depending upon the dimensions of the object which has to undergo annealing treatment and the level of heat resistance required by the application. In general in the case of thick objects it is preferable to use higher temperatures or longer residence times.

The said annealing treatments may also be carried out in confined environments, for example within preheated moulds at constant temperature, preferably from 80 to 100° C. for 1-5 minutes. The specific conditions which have to be used will vary depending upon the dimensions of the object undergoing annealing treatment. In general, in the case of thick objects it is preferable to use longer residence times.

Advantageously, the polyester according to the present invention can undergo solid state polymerization (SSP) process, in order to increase its viscosity. The polymer can be crystallized in an oven at 10-60° C. below its melting point under vacuum (p<2 mbar) for example for 2-150 hours. After crystallization stage the temperature is raised to 10-30° C. below melting point under vacuum, until the desired viscosity is reached. The process can be also carried out under nitrogen flow.

Preferably, polyesters according to the present invention are characterized by $\Delta H_m$ values lower than 5 J/g. Preferably, the polyesters according to the present invention subjected to SSP process are characterized by $\Delta H_m$ values of 20-60 J/g. Preferably, the injection moulded articles made of the polyesters according to the present invention are characterized by $\Delta H_m$ values lower than 5 J/g. Melting Enthalpy $\Delta H_m$ is measured according to ASTM D3418-15. An example of thermal profile to measure Melting Enthalpy can be as follows: heating the sample at temperature from 20° C. to 250° C., at a speed of 10° C./min. The area of the melting peak (an endothermic peak) corresponds to the Melting Enthalpy. The area can be determined by integration by means of established software for the evaluation of DSC data.

The invention will now be illustrated through a number of embodiments which are intended to be by way of example and not to limit the scope of protection of this patent application.

EXAMPLES

Synthesis of Polyesters

The reagents 2,5-furandicarboxylic acid, azelaic acid or sebacic acid and 1,2-ethanediol and the esterification catalyst (Tyzor TE®) were loaded into a 25 geometrical litre steel reactor provided with oil heating, a distillation column, a vacuum line with a distillates knock-down system and mechanical stirring, in the proportions shown in Table 1.

The reactor was sealed and 3 vacuum/nitrogen cycles were carried out to remove the oxygen present. Subsequently the stirrer was switched on and the temperature was gradually raised to 220° C. over a time of 1 hour during which the water deriving from the esterification process began to distil off. The temperature was then raised to 238° C. for approximately a further hour.

Distillation was allowed to proceed for 1 hour at 238° C., at the end of which the apparent conversion was 100% or more.

Vacuum was gradually applied from atmospheric pressure to 100 mbar over approximately 30 minutes to complete the esterification.

At the end of the esterification stage the reactor was returned to atmospheric pressure with nitrogen and then the polymerisation catalyst (1000 ppm of tetraorthobutyl zirconate, ToBZ) was added, the temperature of the melt was held at 238° C. and the pressure was gradually reduced to below 2 mbar over a time of approximately 30 minutes.

The reaction was continued for 4 hours holding the temperature of the melt at 238° C. until the desired inherent viscosity was achieved.

The material was then discharged as filaments through a spinner, cooled in a water bath and granulated into pellets.

The pellets were then subjected to SSP: first they were crystallized in an oven at 10-60° C. below its melting point under vacuum (p<2 mbar) for 72-144 hours. After crystallization stage the temperature was raised to 10-30° C. below melting point and the vacuum was kept at 2 mbar until the desired viscosity was reached.

Determination of the Barrier Properties Against Oxygen and Carbon Dioxide

The barrier properties have been determined on casting films made with of 60-90 μm the polyesters prepared according to Examples 1-4.

Films were prepared using polymer solution casting techniques. Polyesters prepared according to Examples 1-4 were dissolved in a mixture of hexafluoroisopropanol/dichloromethane, coated onto a substrate, then subjected to annealing at temperatures between 60 and 120° C. and with residence times of between 1 and 30 hours, in order to remove any residual trace of solvent, The barrier properties have been determined by permeability measurements carried out in a Extrasolution Multiperm permeabilimeter at 23° C.-50% relative humidity, according to standard ASTM F2622-08 for oxygen and standard ASTM F2476-05 for carbon dioxide.

TABLE 2

Determination of barrier properties

| Example | $P(O_2)$ $\left[\dfrac{cm^3 \times mm}{m^2 \times 24\,h \times bar}\right]$ | $P(CO_2)$ $\left[\dfrac{cm^3 \times mm}{m^2 \times 24\,h \times bar}\right]$ |
|---|---|---|
| 1 | 0.4 | 1.8 |
| 2 | 0.5 | 2.1 |
| 3 comparative | 11.4 | 37 |
| 4 comparative | 3.8 | 13.7 |

Mechanical Properties

Mechanical properties were measured according to standard ASTM D790-03—Method B—$V_0$=13 mm/min on standard test specimens of the "bar" type (length 127 mm, width 12.7 mm, thickness 3.2 mm) using an Instron 4301 model dynamometer. The following were determined: Maximum flexural strength (in MPa), strain at maximum strength (in %) and Flexural Modulus (in MPa).

TABLE 1

Synthesis of polyesters

| Example | 2,5-furandicarboxylate g (mol %*) | Azelaic acid g (mol %*) | 1,2-ethanediol g (mol %**) | Tyzor TE ppm**** | ToBZ ppm**** | Inherent viscosity before SSP*** dl/g | Inherent viscosity after SSP*** dl/g | $T_g$ ° C. |
|---|---|---|---|---|---|---|---|---|
| 1 | 4682 (95%) | 297 (5%) | 3917 (100%) | 400 | 1000 | 0.70 | 0.87 | 71 |
| 2 | 4398 (90%) | 588 (10%) | 3884 (100%) | 400 | 1000 | 0.74 | 0.95 | 63 |
| 3 comparative | 4972 (100%) | — | 3952 (100%) | 400 | 1000 | 0.70 | 0.9 | 81 |

*mol % with respect to the sum of dicarboxylic components
**mol % with respect to the sum of diol components
***measured using an Ubbelohde viscosity meter in 1:1 v/v dichloromethane-trifluoro acetic acid solution at a concentration of 0.5 g/dl at 25° C.
****quantity calculated with respect to the quantity of polyester which can be theoretically obtained by converting all the dicarboxylic acid fed to the synthesis process.
Example 4 (comparative): PET Cleartuf Turbo II

TABLE 3

Mechanical characterization according to ASTM-D790

| Example | Maximum flexural strength (MPa) | Strain at maximum strength (%) | Flexural Modulus (MPa) |
|---|---|---|---|
| 1 | 132 | 5 | 3709 |
| 2 | 127 | 5.2 | 3420 |
| 3 comparative | 141 | 5.2 | 3849 |
| 4 comparative | 83 | 4.6 | 2473 |

The invention claimed is:

1. A thermoformed article comprising at least one layer A comprising a composition which comprises a polyester comprising:
   a) a dicarboxylic component comprising, with respect to the total dicarboxylic component:
      a1) 99-85% in moles of units deriving from 2,5-furandicarboxylic acid or an ester thereof;
      a2) 1-15% in moles of units deriving from at least one saturated dicarboxylic acid selected from the group comprising adipic acid, azelaic acid, sebacic acid, brassylic acid or an ester or derivative thereof;
      a3) 0-15% in moles, of units deriving from at least one aliphatic saturated dicarboxylic acid which is not the saturated dicarboxylic acid in component a2;
      a4) 0-5% in moles, of units deriving from at least one unsaturated aliphatic dicarboxylic acid or an ester thereof;
   b) a diol component comprising, with respect to the total diol component:
      b1) 95-100% in moles of units deriving from 1,2-ethanediol;
      b2) 0-5% in moles of units deriving from at least one saturated aliphatic diol which is not 1,2-ethanediol;
      b3) 0-5% in moles of units deriving from at least one unsaturated aliphatic diol
   wherein the polyester has been subjected to a SSP process and has a permeability of oxygen lower than 3 (cm$^3$× mm)/(m$^2$×24 h×bar), measured at 23° C., 50% relative humidity according to ASTM F2622-08, and a permeability of carbon dioxide lower than 12 (cm$^3$×mm)/ (m$^2$×24 h×bar), measured according to ASTM F2476-05,
   the permeability of oxygen and of carbon dioxide being determined on cast films of thickness from 60-90 μm,
   and at least one layer B comprising at least one polymer selected from the group comprising diacid diol polyesters and hydroxy acid polyesters.

2. The thermoformed article according to claim 1, wherein the mutual arrangement of the layers A and B is selected from A/B, A/B/A and B/A/B.

3. The thermoformed article according to claim 2, wherein the layer B comprises a lactic acid polyester.

4. The thermoformed article according to claim 2, in which the saturated dicarboxylic acid in component a2 in the polyester of layer A is azelaic acid.

5. The thermoformed article according to claim 2, in which the saturated aliphatic dicarboxylic acid (component a3) in the polyester of layer A is selected from saturated C2-C24 dicarboxylic acids, their C1-C24 alkyl esters, their salts and their mixtures.

6. The thermoformed article according to claim 2, in which the saturated aliphatic diol which is not 1,2-ethanediol (component b2) in the polyester of layer A is selected from the group consisting of 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexandimethanol, neopentylglycol, 2-methyl-1,3-propanediol, dianhydrosorbitol, dianhydromannitol, dianhydroiditol, cyclohexanediol, cyclohexanemethanediol, dialkylene glycols and polyalkylene glycols having a molecular weight of 100-4000, polypropylene glycol and mixtures thereof.

7. The thermoformed article according to claim 2, in which the polyester of layer A has an inherent viscosity of more than 0.3 dl/g measured using an Ubbelohde viscosity meter in 1:1 v/v dichloromethane-trifluoroacetic acid solution at a concentration of 0.5 g/dl at 25° C.

8. The thermoformed article according to claim 1, wherein the layer B comprises a lactic acid polyester.

9. The thermoformed article according to claim 8, in which the saturated dicarboxylic acid in component a2 in the polyester of layer A is azelaic acid.

10. The thermoformed article according to claim 8, in which the saturated aliphatic dicarboxylic acid (component a3) in the polyester of layer A is selected from saturated C2-C24 dicarboxylic acids, their C1-C24 alkyl esters, their salts and their mixtures.

11. The thermoformed article according to claim 8, in which the saturated aliphatic diol which is not 1,2-ethanediol (component b2) in the polyester of layer A is selected from the group consisting of 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexandimethanol, neopentylglycol, 2-methyl-1,3-propanediol, dianhydrosorbitol, dianhydromannitol, dianhydroiditol, cyclohexanediol, cyclohexanemethanediol, dialkylene glycols and polyalkylene glycols having a molecular weight of 100-4000, polypropylene glycol and mixtures thereof.

12. The thermoformed article according to claim 8, in which the polyester of layer A has an inherent viscosity of more than 0.3 dl/g measured using an Ubbelohde viscosity meter in 1:1 v/v dichloromethane-trifluoroacetic acid solution at a concentration of 0.5 g/dl at 25° C.

13. The thermoformed article according to claim 1, in which the saturated dicarboxylic acid in component a2 in the polyester of layer A is azelaic acid.

14. The thermoformed article according to claim 13, in which the saturated aliphatic dicarboxylic acid (component a3) in the polyester of layer A is selected from saturated C2-C24 dicarboxylic acids, their C1-C24 alkyl esters, their salts and their mixtures.

15. The thermoformed article according to claim 13, in which the saturated aliphatic diol which is not 1,2-ethanediol (component b2) in the polyester of layer A is selected from the group consisting of 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexandimethanol, neopentylglycol, 2-methyl-1,3-propanediol, dianhydrosorbitol, dianhydromannitol, dianhydroiditol, cyclohexanediol, cyclohexanemethanediol, dialkylene glycols and polyalkylene glycols having a molecular weight of 100-4000, polypropylene glycol and mixtures thereof.

16. The thermoformed article according to claim 13, in which the polyester of layer A has an inherent viscosity of more than 0.3 dl/g measured using an Ubbelohde viscosity meter in 1:1 v/v dichloromethane-trifluoroacetic acid solution at a concentration of 0.5 g/dl at 25° C.

17. The thermoformed article according to claim 1, in which the saturated aliphatic dicarboxylic acid (component a3) in the polyester of layer A is selected from saturated C2-C24 dicarboxylic acids, their C1-C24 alkyl esters, their salts and their mixtures.

18. The thermoformed article according to claim 17, in which the saturated aliphatic diol which is not 1,2-ethanediol (component b2) in the polyester of layer A is selected from the group consisting of 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexandimethanol, neopentylglycol, 2-methyl-1,3-propanediol, dianhydrosorbitol, dianhydromannitol, dianhydroiditol, cyclohexanediol, cyclohexanemethanediol, dialkylene glycols and polyalkylene glycols having a molecular weight of 100-4000, polypropylene glycol and mixtures thereof.

19. The thermoformed article according to claim 1, in which the saturated aliphatic diol which is not 1,2-ethanediol (component b2) in the polyester of layer A is selected from the group consisting of 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexandimethanol, neopentylglycol, 2-methyl-1,3-propanediol, dianhydrosorbitol, dianhydromannitol, dianhydroiditol, cyclohexanediol, cyclohexanemethanediol, dialkylene glycols and polyalkylene glycols having a molecular weight of 100-4000, polypropylene glycol and mixtures thereof.

20. The thermoformed article according to claim 1, in which the polyester of layer A has an inherent viscosity of more than 0.3 dl/g measured using an Ubbelohde viscosity meter in 1:1 v/v dichloromethane-trifluoroacetic acid solution at a concentration of 0.5 g/dl at 25° C.

21. The thermoformed article according to claim 1, wherein the polyester of layer A has a ΔHm value of 20-60 J/g.

22. The thermoformed article according to claim 1, wherein the polyester of layer A has been subjected to a SSP process performed by crystallizing the polyester in an oven at 10-60° C. below its melting point under vacuum of p<2 mbar for 2-150 hours or under nitrogen flow; and after crystallization stage the temperature is raised to 10-30° C. below melting point under vacuum, until the desired viscosity is reached.

* * * * *